W. H. LUNGREN.
JOURNAL BOXES.
No. 182,525.   Patented Sept. 26, 1876.
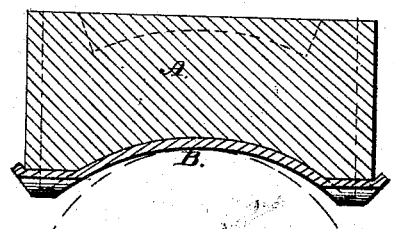
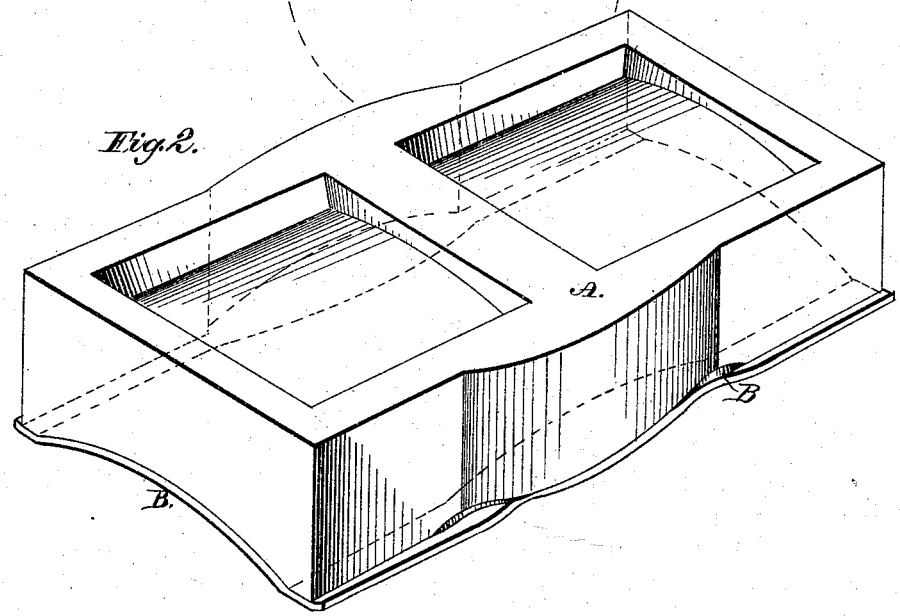

UNITED STATES PATENT OFFICE.

WILLIAM H. LUNGREN, OF WILMINGTON, DELAWARE.

IMPROVEMENT IN JOURNAL-BOXES.

Specification forming part of Letters Patent No. 182,525, dated September 26, 1876; application filed August 14, 1876.

*To all whom it may concern:*

Be it known that I, WM. H. LUNGREN, of the city of Wilmington, county of New Castle, State of Delaware, have invented a new and useful arrangement of preventing axle-journals from heating, which may be caused by uneven turning or wear, which is fully set forth in the following specification, reference being had to the accompanying drawing.

The arrangement relates to journals and bearings of car-axles; and consists in interposing a loose liner of lead or other soft metal between the axle-journal and hard-metal bearing.

The object of my invention is to prevent the heating of railroad-car axle-journals, when caused by uneven wear or improperly-turned journals, or from concave wear of journals, any or all of which would cause an uneven bearing.

I use any ordinary metal bearings, made of brass, composition, or iron, rough, as they come from the foundery, and insert between the bearing A and axle-journal C a loose lead liner, B, made of sheet-lead or other soft metal. These lead liners B are made from merchantable sheet-lead of proper thickness—say, from one-sixteenth to one-tenth of an inch—cut to such size as will cover entire the inner side of metal bearing A, as shown in Figures 1 and 2 of accompanying drawing.

By use of the loose soft-metal liner B between the bearing A and axle-journal C any unevenness in journal C or bearing A is compensated for by yielding of soft-metal liner B.

I am aware that lead, Babbitt, or soft composition has been used to face bearings for car-journals; but in all cases where the faces wear, the bearings have to be renewed entire, as the worn ones have to be taken out to reline; but by my invention you need not remove the bearing, but only replace the movable lead liner, which can readily be done, and which remains in place without any mechanical attachment.

I claim as my invention—

The loose liner of soft metal between car-axle journals and hard-metal bearings, so arranged that they can be removed and replaced at pleasure, and thereby prevent the heating of journals caused by any unevenness from wear or otherwise, substantially as described.

W. H. LUNGREN.

Witnesses:
LOUIS ROSS BARKER,
CHARLES M. HARDY.